United States Patent [19]

Karell

[11] 4,295,832
[45] Oct. 20, 1981

[54] EDUCATIONAL TOY

[76] Inventor: Manuel L. Karell, 17925 Devonshire, Apt. 21, Northridge, Calif. 91325

[21] Appl. No.: 91,586

[22] Filed: Nov. 5, 1979

[51] Int. Cl.³ .............................................. G09B 1/06
[52] U.S. Cl. ...................................... 434/168; 46/236; 273/1 M; 434/190
[58] Field of Search ................. 46/236, 238, 241, 242; 273/1 M; 35/73, 77, 34, 19 A, 31 B, 31 D, 32; 434/168, 190

[56] References Cited

U.S. PATENT DOCUMENTS

| | | | |
|---|---|---|---|
| 2,570,625 | 10/1951 | Zimmerman et al. | 46/236 X |
| 2,707,106 | 4/1955 | Cunningham | 273/109 X |
| 2,961,796 | 11/1960 | Davis | 273/109 X |
| 2,994,984 | 8/1961 | Luchsinger | 273/138 A X |
| 3,074,206 | 1/1963 | Fischl-Bernfi et al. | 273/109 X |
| 3,134,595 | 5/1964 | Chenoweth et al. | 273/109 X |
| 3,217,446 | 11/1965 | Steert | 46/242 |
| 3,407,530 | 10/1968 | Grant et al. | 46/241 X |
| 3,550,936 | 12/1970 | Puttick | 46/236 X |
| 4,102,038 | 7/1978 | Eagan | 29/592 R |

FOREIGN PATENT DOCUMENTS 174226  3/1953  Austria ..................................... 35/32

OTHER PUBLICATIONS

Welch Scientific Company Catalog *Scientific Apparatus and Supplies* Copyright 1965, Title Page and p. 171.

*Primary Examiner*—William H. Grieb

[57] ABSTRACT

A novel educational toy is provided which comprises, in combination, an elongated support rod and a plurality of separated magnetic members slideably received on the rod. Each member has a pair of opposed faces, the faces having an opposite polarity to each other, and the members are arranged on the rod so members of separate groups are magnetically attracted to one another, while each group repels adjacent groups, so that groups are effectively spaced along the rod. Each magnetic member bears identifying indicia, the members of each group also collectively providing separate distinct group indicia. The member indicia may be symbols, numbers, letters, or the like. Alternatively, they may be configurations for the members which resemble solid objects.

A handle may be provided for moving the entire toy. The members can be easily aligned with each other by means of for example, matching detents on adjoining faces, and/or tabs to facilitate handling thereof. The rod may be in a hoop configuration, or in a square or a straight length, and a plurality of rods can be employed to form a ladder or abacus configuration or the like. The toy is simple, inexpensive, and durable, and is capable of teaching physical dexterity, letter combinations, etc., to form words, simple mathematical computations and other relationships, while amusing the child user.

5 Claims, 12 Drawing Figures

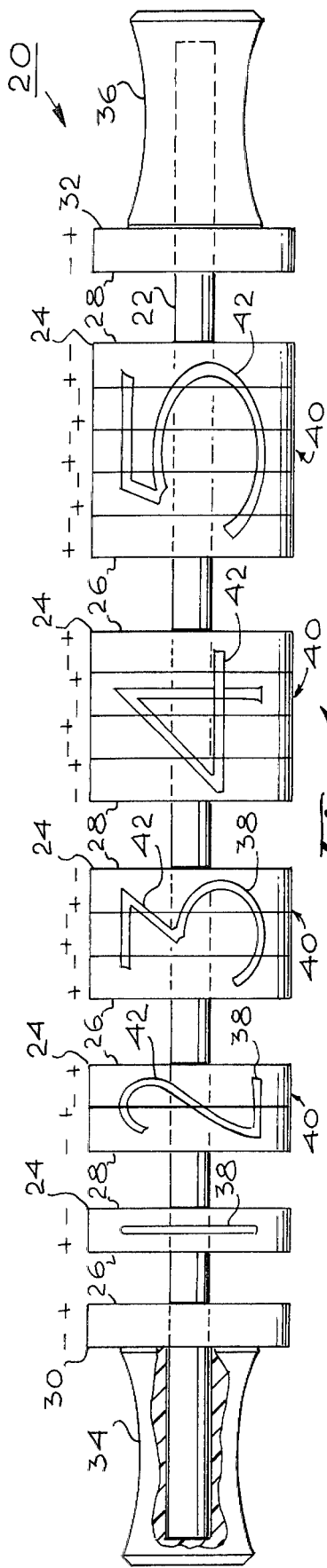
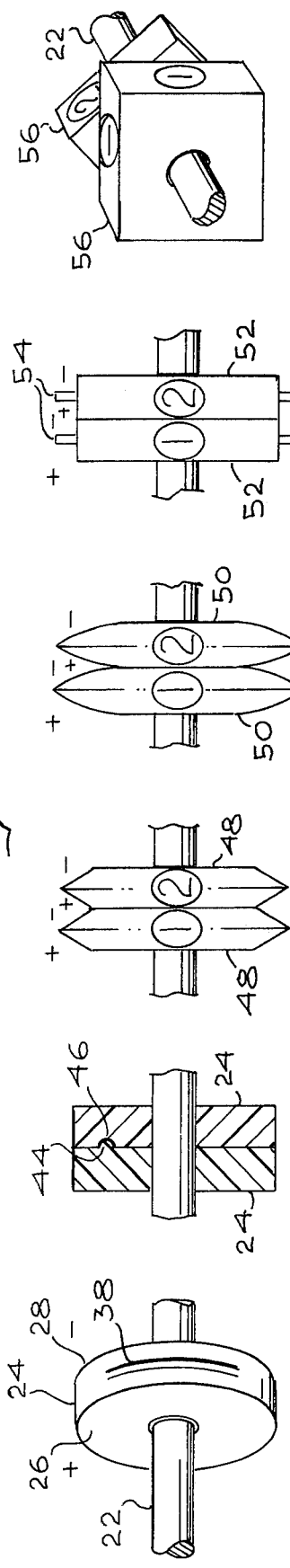

EDUCATIONAL TOY

BACKGROUND OF THE INVENTION

1. Field of the Invention

The present invention generally relates to toys and more particularly to novel educational magnetic toys.

2. Prior Art

Various types of magnetic toys have been provided for children. Some are devices upon which to play games of chance. See, for example, U.S. Pat. No. 2,707,106. Others are designed to provide for other forms of competition between two or more players. See, for example, U.S. Pat. Nos. 4,102,038, and 3,134,595. Still others depend on manipulation and/or visual effects and/or sound effects to provide amusement. See, for example, U.S. Pat. Nos. 3,074,206; 2,961,796, and 2,994,984. Most such devices, including those illustrated in the above-enumerated patents, are complicated and expensive to make. Moreover, they have little or no educational value.

It would be desirable to provide a magnetic toy of an improved type, capable of educating as well as amusing a child, which toy could be made inexpensively and operated in a simple manner.

SUMMARY OF THE INVENTION

The novel educational toy of the present invention satisfies the foregoing needs. It is simple to make and operate, is inexpensive and durable and teaches effectively while it amuses children in their formative years. The toy can be fabricated so as to teach words and word groupings, simple mathematical calculations, and relationships of other types.

The toy is substantially as set forth in the abstract above. Thus, it includes an elongated rod in straight form or in the form of a circular ring or loop, or square or other configuration, upon which are slideably received magnetic members, each bearing separated indicia, such as words, letters, numbers, symbols, or the like.

Two opposite sides of each of the members bear an opposite magnetic polarity and the members are arrangeable on the rod so that the members are magnetically attracted into separated groups which groups magnetically repel each other and thus the groups are spaced along the rod. The members of each group can collectively provide a separate distinctive group indicium, as, for example, separately colored groups.

A handle may be provided to move the toy around to help align and realign the members on the rod and detent means preferably releasably engage the rod at opposite ends thereof so that the magnetic members can also be slid off and on the rod to substitute them and to rearrange them in desired sequences for particular purposes, such as word spelling, addition and subtraction, grouping etc. The members can be in any form, for example, squares, or rectangular blocks or discs and may include detent means on their adjacent surfaces and/or tab means or the like to facilitate aligning the members for viewing of their indicia and for separating and moving them as needed. The magnetic members of the toy of the present invention can be fabricated inexpensively of magnetic metal or magnetic metal impregnated plastic or the like, while the rod can be wood, glass, plastic, paper, etc., as can the handle and end detent. The magnetic members can also be coated with clear or colored paints, plastic or other nontoxic coatings, as desired. Various other features are set forth in the following details description and accompanying drawings.

DRAWINGS

FIG. 1 is a schematic front elevation partly broken away, of a first preferred embodiment of the novel educational toy of the present invention;

FIG. 2 is a schematic fragmentary perspective view of one of the disc members of FIG. 1 on the rod of FIG. 1;

FIG. 3 is a schematic cross-section of an adjacent pair of detent means on adjacent surfaces of said adjacent pair;

FIG. 4 is a schematic front elevantion of a first alternative form of a pair of magnetic members disposed on the rod of FIG. 1;

FIG. 5 is a schematic front elevation of a second alternative form of a pair of magnetic members disposed on the rod of FIG. 1;

FIG. 6 is a schematic front elevation of a third alternative form of a pair of magnetic members disposed on the rod of FIG. 1;

FIG. 7 is a schematic front elevation of a fourth alternative form of a pair of magnetic members disposed on the rod of FIG. 1;

FIG. 8 is a schematic front elevation of a second preferred embodiment of the novel toy of the present invention;

DETAILED DESCRIPTION

Figure 9:
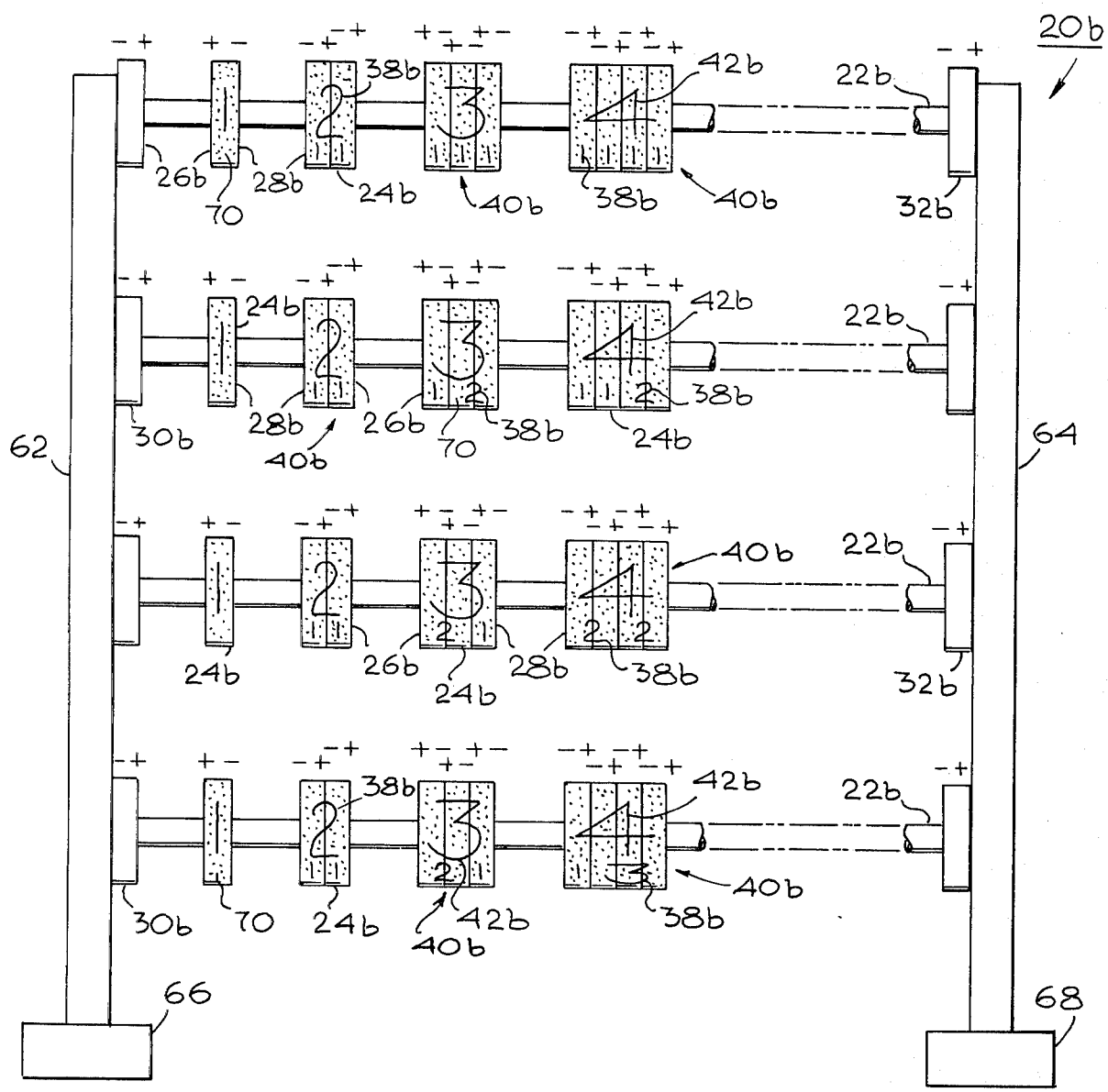
FIG. 9 is a schematic front elevation of a third preferred emobidment of the novel toy of the present invention.

FIGS. 1-7:

Now referring more particularly to FIG. 1, wherein a first preferred embodiment of the novel toy of the present invention is schematically depicted, it will be noted that toy 20 includes an elongated straight rod 22 upon which are slideably received a plurality of magnetic members 24 in disc form (FIG. 2) oriented with their major axes generally perpendicular to the longitudinal axis of rod 22. Each member 24 has two opposite flat sides 26 and 28 which have opposite magnetic polarity. Side 26 has positive polarity and side 28 negative polarity.

Toy 20 also includes magnetically polarized disc detents 30 and 32 adjacent opposite ends of rod 22, and handles 34 and 36 secured to opposite ends of rod 22 and the outer forces of detents 30 and 32, respectively. At least one of these handles and the associated detent are removable from rod 22 so as to be able to slip members 24 off rod 22 and re-applied in any desired sequence.

Each member 24 include separate distinctive indicia 38 in the form of numerals or portions of numerals. Assembly of members on rod 22 in proper alignment will result in the formation of a number of groups 40, each having a different indicium 42 formed of the indicia 38 or the member 24 of that group and related to the number of members 24 in that group. The members of each group are held together by magnetic attraction, while the groups 40 magnetically repel each other and thus keep their spacing on rod 22.

Thus, in its simplest form, toy 20 can be played by first manually separating members 24 by their alignment shown in FIG. 1, from each other, spinning them on rod 22 and then rearranging them while still on rod 22 to reform the proper alignment shown in FIG. 1, with the indicia 38 and 42 in full view.

Alternatively, members 24 can first be removed from rod 22 then jumbled up and then returned to rod 22 one at a time, the problem being to place them on rod 22 in the proper sequence to align them properly for proper formation of the indicia 38 into indicia 42. The polarity of the opposed forces of the two detents 30 and 32 may be opposite to each other as shown in FIG. 1, and the alignment of members 24 on rod 22 then will also involve proper alignment of members 24 for magnetic repulsion of groups 40 to form both detents 30 and 32, as well as from each other.

It will be readily understood that indices 38 and 42 can be other numbers than those shown, or can be letters, symbols, etc., as desired. Moreover, as shown in FIG. 3, selected sides 26 and 28 of selected members 24 may be provided with indexing detents 44 and 46, to help with the positioning of selected members 24 against each other to help align indices 38 of those members 24 with each other to properly form indices 42.

If desired, the magnetic members in the toy of the present invention which are used can be specially configured to help manual alignment thereof. This would be especially helpful to small children who might have difficulty separating discs which present a smooth outer periphery. Thus, for example, as shown in FIG. 4, magnetic elements 48 are discs with outer peripheries which are generally steeple shaped in vertical cross-section, while the magnetic elements 50 of FIG. 5 are lozenge shaped in vertical cross-sections while magnetic elements 52 of FIG. 6 have peripheral tabs 54.

Alternatively, magnetic elements 56 of FIG. 7 may be used, which are rectangular or square in side elevation, rather than circular discs shown in FIGS. 1-6, so that the projecting corners thereof allow one to readily separate discrete, adjacent magnetic members.

Thus, elements 48, 50, 52, and 56 can readily be substituted and interchanged, if desired, for elements 24 in toy 20, to provide variety to the toy 20. Toy 20 provides good educational practice in recognizing numerals and assessing their value. Moreover, it is fun to play, while marvelling at the "magic" of magnetic theory.

FIG. 8.

A second preferred embodiment of the novel toy of the present invention is schematically depicted in FIG. 8. Thus, toy 20a is shown which is generally similar to toy 20. Components of toy 20a are similar to those of toy 20 and bear the same numerals but are followed by the letter "a".

Thus, toy 20a includes rod 22a, members 24a having oppositely polarized sides 26a and 28a, detets 30a and 32a, and handles 34a and 36a. Rod 22a is preferably in two sections 58 and 60 internally threaded together, so that rod 22 can be disassembled easily to remove members 24a therefrom. Indicia 38a on members 24a form group indicia 42a when members 24a are formed into the proper groups. However, indicia 38a are letters and indicia 42a are words.

Toy 20a can be used in exactly the same manner as toy 20, but in this instance to form the proper words. Detents 30a and 32a have faces opposing each other which are of the same polarity. Toy 20a has substantially the same advantages of toy 20, but allows one to learn with words rather than numbers.

The toy 20a of FIG. 8 lends itself readily to use as a work and sentence construction learning device. For example, a series of sentences can be pre-selected, with all letters used to spell the words in the sentence being of a given color. The letters in each word would be carried by magnetic members which are appropriately polarized so they only fill in a particular co-acting sequence of attraction between letters in a word and repulsion of associated groups of words. A child would try to arrange the magnetic members in proper sequence on the rod, selecting individual magnetic members from a box, to correctly spell out proper words and arrange them in a proper sentence.

Likewise, different sets of like-colored magnetic members could be employed to form other and different words and sentences. Other and different extensions of this basic concept readily come to mind and are considered to fall within the purview of this inventive concept.

FIG. 9.

A third preferred embodiment of the novel educational toy of the invention is schematically depicted in FIG. 9. Thus, toy 20b is shown which comprises various components. Those components similar to those of toy 20 bear the same numerals but are succeeded by the letter "b". Toy 20b is in abacus form.

For this purpose, it includes a plurality of horizontal rods 22b disposed in spaced, vertical ladder like array and held in position by attachment at the opposite ends thereof to vertical posts 62 and 64 having support bases 66 and 68, respectively. Each rod 22b is provided with members 24b having oppositely polarized sides 26b and 28b. Polarized detents 30b and 32b are also provided.

Indicia 38b aid mathematical calculations, while indicia 42b of groups 40b represent the sum of the members 24b of the particular group 40b. Opposing faces of detents 30b and 32b are oppositely polarized. The periphery 70 of members 24b is stippled to facilitate manipulation of members 24b on rods 22b.

It will be noted that two forms of the numbers four are used in indicia 42b and that several forms of indicia 38b are used, including designations which variously add up to the same total, e.g., "1" plus "3", "2" plus "2", etc. Thus, practice in simple mathematics is provided and toy 20b has substantially all the other advantages of toy 20, hereinabove set forth.

FIG. 10.

Figure 10:
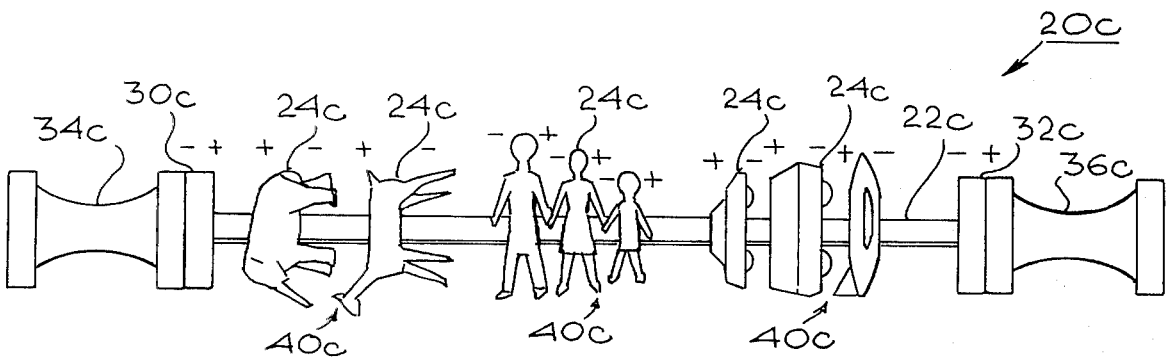
FIG. 10 is a schematic front elevation of a fourth preferred embodiment of the novel toy of the present invention.

FIG. 10 schematically depicts a fourth preferred embodiment of the invention wherein toy 20c is shown generally similar to toy 20b comprising rod 22c upon which are releasably threadably received polarized detents 30c and 32c, and handles 34c and 36c and upon which magnetic members 24c are slideably received. Members 24c are dividable into three groups, 40c, animals, people and vehicles, members 24c within each group being attracted to each other when placed in a proper order. Toy 40c is utilizable in the manner of toy 20.

Figure 12:
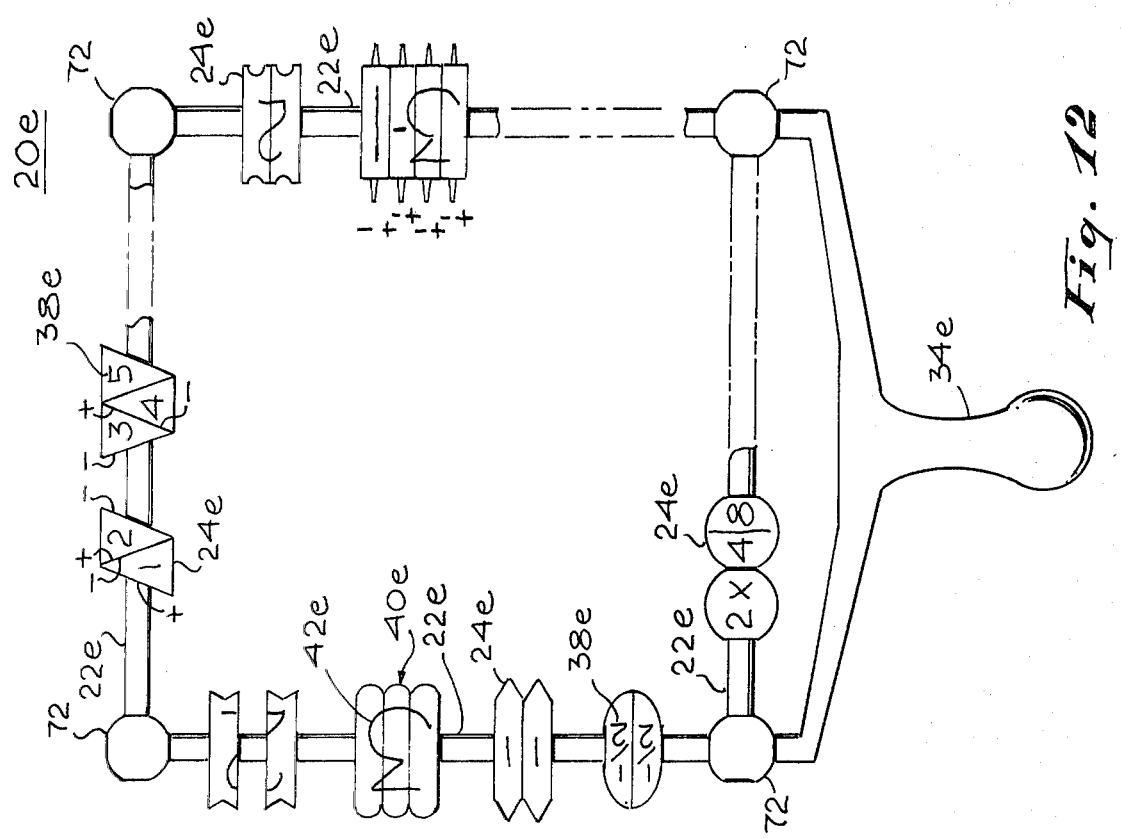
Figure 11:
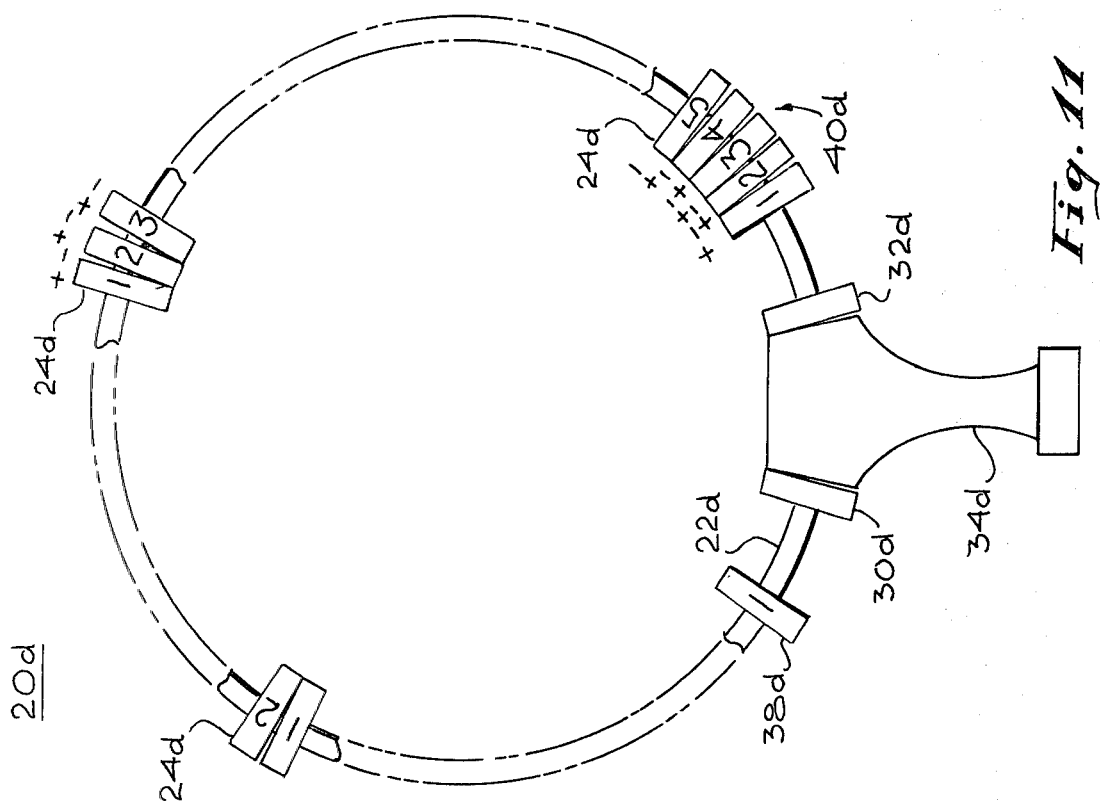
FIG. 11 is a schematic front elevation of a fifth preferred embodiment of the novel toy of the present invention and, FIG. 12 is a schematic front elevation of a sixth preferred embodiment of the novel toy of the present invention.

FIGS. 11 and 12.

FIGS. 11 and 12 depict, respectively, fifth and sixth embodiments of the novel toy of the invention, each of which is constructed similarly to toy 20 and functions similarly thereto. Thus, FIG. 11 depicts toy 20d which differs from toy 20 only in that rod 22d is a circular hoop, opposite ends of which are releasably held by a single handle 34d bearing polarized detents 30d and 32d. Magnetic members 24d having indicia 38d are slideably disposed on rod 22d to provide an educational toy.

In FIG. 12, a plurality of rods 22e bearing magnetic members 24e are releasably interconnected by retainers 72 to form a hollow square array secured to a single handle 34e. It will be noted that the shape of members 24e varies, forming a clue in each instance to the proper assembly of members 24e on rods 22e. Indicia 38e also represent clues for proper assembly of members 24e together to form groups 40e bearing indicia 42e. Multiplication, addition and subtraction exercises are depicted by indicia 38e and 42e. Thus, toy 20e is generally useful in the manner of toy 20.

If desired, the toy assembly 20e of FIG. 12 can be presented in a disassembled fashion to a child, as in kit form. The child would then try to assemble the kit, in a similar manner to "Tinker-Toys", to construct the frame, while placing the magnetic (coded) members on each rod in a correct manner. The educational benefits of arithemetic, spacial relationships, manual dexterity, form recognition, etc., are obvious.

It has been observed that the magnetic members especially when in the square form of FIG. 7, have a tendency to spin with respect to one another when they are moved along the rod. This feature provides an additional entertaining and amusing function to the device.

It has also been noted that children observed while playing with toy 20 are fascinated and amused in the manner in which the members move back into their ordered relationship when one releases the magnetic members after perhaps bunching all groups together to one side of the rod. Children (and adults) seem to enjoy pushing the groups together and watching them move to their appropriate positions after freeing them for movement.

Compressing the groups can likewise be achieved by rapidly jerking the rod and allowing the magnetic members to congregate to one side and when the rod is brought to a stop, the groups rapidly segregate.

When the toy 20 shown in FIG. 1, is presented in a vertical fashion, the magnetic groups move slightly downward, due to the pull of gravity responsive to the weight of the magnetic members in each group. Nevertheless, the magnetic repulsion forces in the magnetic member are designed so they have sufficient strength to keep each group spaced from one another. By moving the rod up and down rapidly, the groups will temporarily congregate at the top and bottom, but on cessation of the motion, the groups will promptly segregate. This interplay between the laws of gravity and magnetism can readily be observed by children, who will gain an insight and understanding of these laws of nature while enjoying themselves.

The elongated rods can be of circular cross-section, as shown, but can readily have an oval, triangular, square, etc., cross-sectional area, with the magnetic members having a matching internal opening, so that the magnetic members can easily slide over the rod. These different types of rods might be employed in the kit of FIG. 12, to give more variety and provide an additional educational feature.

Various modifications, changes, alterations, and additions can be made in the toy of the present invention, its components and their parameters. All such modifications, changes, alterations, and additions as are within the scope of the appended claims form a part of the present invention.

What is claimed is:

1. A novel educational toy comprising in combination:
   a. an elongated support rod;
   b. a plurality of separate magnetic members slideably received on said rod, each said member having a pair of opposite sides of opposite magnetic polarity, said members being mutually magnetically attracted into separate groups on said rod, said groups being mutually magnetically repelled from each other so as to be spaced along said rod;
   c. wherein some of said members bear identifying indicia;
   d. wherein members of each of said groups collectively provide a separate distinctive group indicium; and
   e. wherein said indicia are letters of the alphabet.

2. The educational toy of claim 1 wherein each group has related letters which form words.

3. The educational toy of claim 1 wherein the groups collectively spell out a sentence.

4. A novel educational toy comprising in combination:
   a. an elongated support rod;
   b. a plurality of separate magnetic members slideably received on said rod, each said member having a pair of opposite sides of opposite magnetic polarity, said members being mutually magnetically attracted into separate groups on said rod, said groups being mutually magnetically repelled from each other so as to be spaced along said rod;
   c. wherein some of said members bear identifying indicia;
   d. wherein members of each of said groups collectively provide a separate distinctive group indicium; and
   e. wherein all said members of each group have the same configuration and wherein the members of each said group differ in configuration from members of said other groups.

5. A novel educational toy comprising in combination:
   a. an elongated support rod;
   b. a plurality of separate magnetic members slideably received on said rod, each said member having a pair of opposite sides of opposite magnetic polarity, said members being mutually magnetically attracted into separate groups on said rod, said groups being mutually magnetically repelled from each other so as to be spaced along said rod;
   c. wherein some of said members bear identifying indicia;
   d. wherein members of each of said groups collectively provide a separate distinctive group indicium; and
   e. wherein a plurality of said rods are disposed in a ladder configuration, wherein said group indicia are numbers and wherein the indicia of the members of each said group bear mathematical relationship to the indicium of that group.

* * * * *